United States Patent [19]
Handke

[11] 4,069,906
[45] Jan. 24, 1978

[54] FLUID DRIVE COOLING APPARATUS

[76] Inventor: Kenneth E. Handke, 2034 Mayview Ave., Cleveland, Ohio 44109

[21] Appl. No.: 763,146

[22] Filed: Jan. 27, 1977

[51] Int. Cl.² .................. F16D 13/60; F16D 13/72
[52] U.S. Cl. .................. 192/113 B; 188/264 E; 188/264 P; 60/337
[58] Field of Search ............ 192/113 B, 58 B, 58 C, 192/18 A; 188/264 E, 264 P; 60/337, 456

[56] References Cited

U.S. PATENT DOCUMENTS

| | | | |
|---|---|---|---|
| 2,576,156 | 11/1951 | Trofimov | 192/58 C |
| 3,638,773 | 2/1972 | Lewis et al. | 192/18 A |
| 3,696,898 | 10/1972 | Sommer | 192/18 A |
| 3,912,060 | 10/1975 | Handke | 192/113 B |
| 3,924,715 | 12/1975 | Cory | 192/113 B |

Primary Examiner—Edgar W. Geoghegan
Attorney, Agent, or Firm—McNenny, Pearne, Gordon, Gail, Dickinson & Schiller

[57] ABSTRACT

Cooling apparatus is disclosed for drives of the type having a housing containing a sump for a fluid which is heated by the generation of heat energy during operation of the drive. The heat energy is generated by relatively moving torque transmitting members, such as clutch and brake units, connected between the drive input and output shafts. A centrifugal pump located within the housing below the level of the fluid is driven by the input shaft and circulates fluid to a heat exchanger disposed about the outside surface of the housing. The cooled fluid is returned to the fluid sump and a brake reservoir which assures an ample supply of fluid to the brake at a relatively low pressure. A fan carried by the input shaft blows ambient air over the heat exchanger and exterior surface of the housing to enhance the level of heat dissipation.

16 Claims, 3 Drawing Figures

FLUID DRIVE COOLING APPARATUS

BACKGROUND OF THE INVENTION AND PRIOR ART

The present invention generally relates to cooling apparatus for torque transmitting units and drives of the type wherein a fluid sump contained within a housing is heated by the generation of heat energy during operation of relatively movable torque transmitting members connected between an input shaft and an output member.

The types of drives of concern herein are employed to control the speed of the output member in relation to that of the input shaft, and they are generally characterized by a relative speed difference or slip between the torque transmitting members which results in the generation of heat energy and the heating of the fluid in the drive housing. In a disc type torque transmitting unit, such as a clutch or a brake, heat is primarily generated by mechanical losses in the engaging discs or disc pack as a result of slippage and friction developed during acceleration and deceleration of the load. When the torque transmitting unit is used in a constant slip application such as a tension or drag apparatus, large amounts of frictional heat are continuously generated. In these instances, the clutch may be operated in the sump as a fluid bath to enhance heat dissipation, and the unit is referred to as a wet application. The high rates of heat generation of concern herein are also present in hydroviscous drives which are continuous slip devices wherein the torque is transmitted by shearing a film of fluid intermediate adjacent discs. The hydrokinetic type drive is also characterized by high rates of heat generation in the torque transmission fluid. In this instance, an impeller rotor acts as a centrifugal pump to impart kinetic energy to the fluid and a runner or output rotor acts as a turbine using the kinetic energy to drive the output shaft. In all of the foregoing drives, it is apparent that the torque transmission fluid is supplied to the torque transmitting members from the sump and returned to the sump at an elevated temperature during the operation of the drive, and that the heat energy generated must be dissipated in order to assure satisfactory operation of the drive.

The dissipation of the heat developed during the operation of such torque transmitting devices is an important design factor of the drive. The overall temperature must be limited to prevent overheating of the system. Further, torque transmission is affected by temperature and a uniform temperature should be maintained in order to enhance the consistency of operation of the drive.

The prior art is exemplified by U.S. Pat. Nos. 3,696,898, 3,638,773 and 2,576,156 which illustrate disc type drives and cooling apparatus. In accordance with various prior art devices, pumps for circulating the torque transmission fluid to heat exchangers are located remote of the fluid sump contained in the housing. The pumps are connected to the fluid sumps by pump inlet pipes, and the pumps may be mounted within the housing for operation by the drive input shaft or they may be mounted externally of the drive housing and independently driven. In other applications, the prior art teaches the disposition of a heat exchanger within the drive housing and independently circulating a cooling liquid therethrough for providing liquid-liquid heat exchange to cool the torque transmission fluid. Further, the use of input shaft driven fans for blowing cooling air over the outside surface of the drive housing is disclosed in the prior art.

The prior art has not efficiently resolved the heat dissipation requirements in such drives. The prior art structures are typically of limited thermal capacity, and they have generally resulted in drive operation restrictions as well as special cooling apparatus structure which significantly increase the size and cost of the drive. To an extent, the deficiencies of the prior art structures have resulted from the fact that the fluid within the housing is in a highly agitated condition and contains relatively large amounts of entrained air as a result of the operation of the relatively moving torque transmitting members. In order to pump and circulate the fluid under these conditions, the prior art has generally resorted to the use of pump inlets disposed adjacent the lower and calmer regions of the sump in efforts to assure a more constant intake of fluid having a minimum amount of entrained air. This results in a suction head which the pump must work against, pipe friction losses, potential pump priming problems, and the costs and routing problems associated with the inlet piping in the housing. The mounting of the pump externally of the drive housing may not avoid the foregoing problems and such an arrangement will create additional fluid sealing considerations, require additional pump mounting structure, and result in a less compact system.

In other drive applications requiring high levels of heat dissipation, the prior art has frequently resorted to liquid-liquid heat exchanger systems which significantly increase the overall size and installation requirements for the drive and result in correspondingly significant cost increases. The disposition of such a heat exchanger within the drive housing also creates additional sealing problems and the risk of contaminating the torque transmission fluid, which typically comprises a viscous oil having particular viscosity characteristics, with the liquid coolant.

SUMMARY OF THE INVENTION

The present invention provides cooling apparatus for torque transmitting units and drives of the type including a housing containing a sump for a fluid which is heated by the generation of heat energy in the fluid during torque transmission by relatively movable torque transmitting members which are operably connected between an input shaft and an output member. The cooling apparatus includes a centrifugal pump located within the housing and having a pump intake port disposed below the level of the fluid sump. The centrifugal pump is driven by the input shaft and draws fluid directly from the surrounding sump for circulation through a heat exchanger disposed externally of the housing. The centrifugal pump is constructed and arranged to provide a structurally and functionally efficient system which enables high levels of fluid circulation and heat dissipation.

In the illustrated embodiment, the centrifugal pump is mounted about the input shaft and includes radially extending vanes operably connected to the input shaft for rotation therewith. The vanes are disposed within an annular pump chamber extending about the input shaft. The annular pump chamber is connected between the pump intake port and a pump exhaust port which in turn is connected to the heat exchanger. The annular pump chamber is provided with a progressively increasing cross sectional area in oppositely extending angular directions along its arcuate length toward the exhaust port.

The heat exchanger comprises expanded surface tubing which is coiled about the outside surface of the drive housing. A fan driven by the input shaft directs the flow of ambient air over the heat exchanger.

The disposition of the centrifugal pump within the fluid sump and the intake port configuration assure an abundant supply of fluid to the pump even when the fluid sump is highly agitated and contains relatively large amounts of entrained air. Further, it is not necessary for the pump to overcome a suction head pressure, and the pump is essentially self-priming. The latter considerations are particularly advantageous in cyclic drive applications as well as applications involving high load inertias where increased levels of heat generation are encountered and the input shaft is not necessarily rotating at a continuous and/or high speed.

The foregoing advantages and improvements relative to the drive of the present invention are obtained in a structurally efficient manner since the pump casing is integrally formed by the drive housing adjacent an axial end thereof, supported without additional housing webs, and thereby occupies a minimum amount of space within the drive housing. The location of the pump within the fluid sump also avoids the use of pump inlet piping and the routing problems associated therewith.

In a further aspect of the present invention, the disposition of the heat exchanger about the drive housing and the mounting of the fan on the input shaft to blow air over the heat exchanger enables the achievement of a complete, circulating pump-heat exchanger cooling system and significant levels of heat dissipation in an integral drive unit. Accordingly, the drive unit and self-contained cooling system can be directly employed as an integrally cooled drive unit without additional mounting structure or controls for the achievement of adequate cooling and heat dissipation. Similarly, the integrally cooled drive unit can be more readily and efficiently incorporated into more extensive machinery applications including punch presses, conveyors and test equipment such as dynamometers.

DETAILED DESCRIPTION OF THE DRAWINGS

Figure 1:
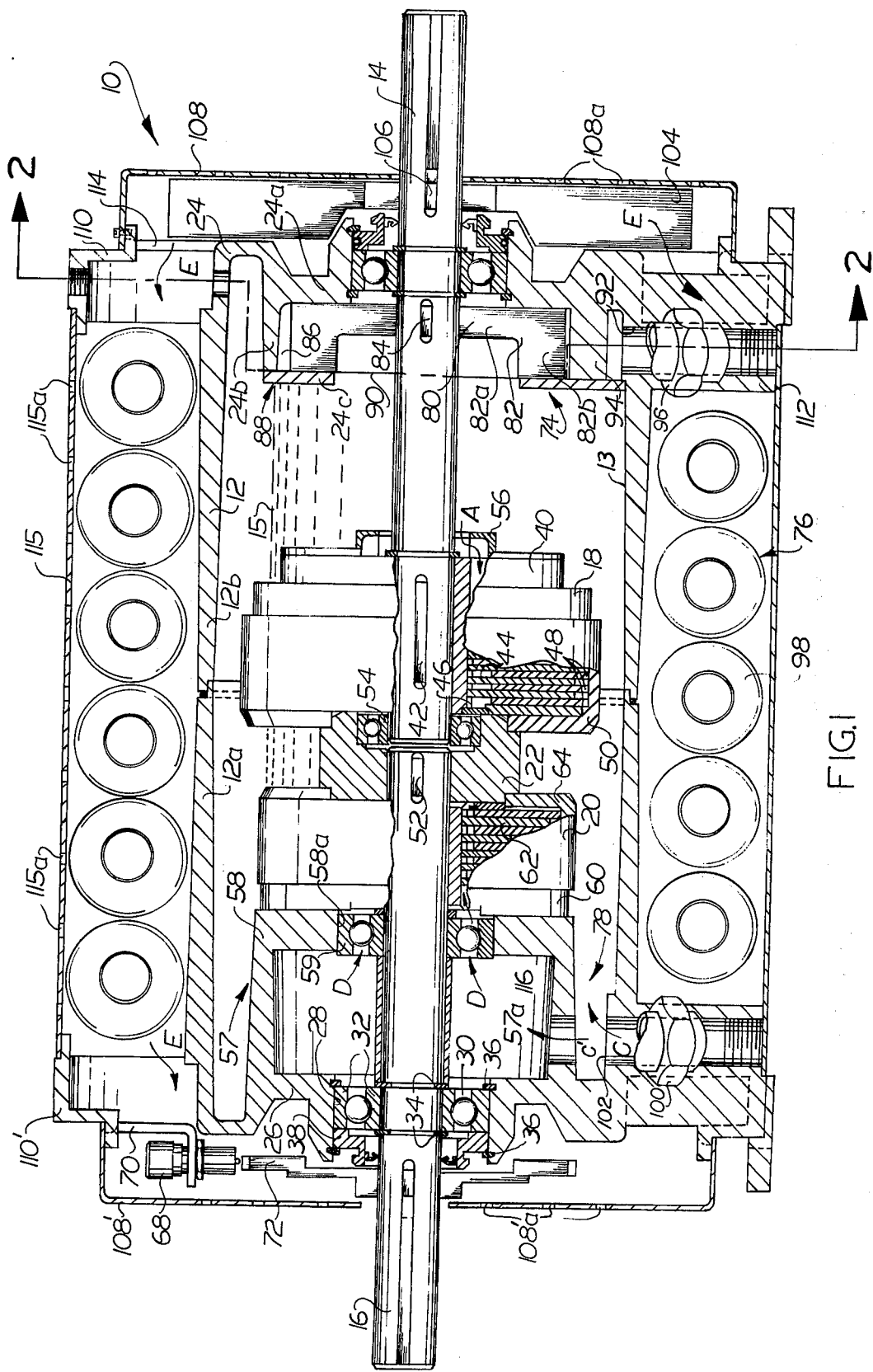
FIG. 1 is an elevational view, partially in section, of a drive including cooling apparatus in accordance with the present invention, with parts broken away for purposes of illustration and the plane of the section being indicated by the line 1—1 in FIG. 2.

Referring to the drawings, there is shown a variable speed drive unit 10 including a housing 12 formed by housing halves 12a and 12b. The housing halves 12a and 12b are joined in a fluid-tight seal to form a cavity 13 which provides a fluid sump for fluid 15 within the housing 12. The drive 10 also includes an input shaft 14 and an output member or shaft 16 which are operatively connected by means of an electromagnetic clutch 18 and an electromagnetic brake 20. The clutch 18 and the brake 20 are hydroviscous type units, and they operate through a center coupling 22 for purposes of transmitting torque to the output shaft 16. The input torque to the drive 10 may be provided by connection of the input shaft 14 to any suitable prime mover such as an electrical motor (not shown).

The shafts 14 and 16 are respectively provided with bearing support adjacent oppositely disposed end walls 24 and 26 of the housing 12. The end wall bearing support provided for each of the shafts is identical and only that provided for the shaft 16 will be described in detail, it being understood that similar bearing support is provided for the shaft 14.

The output shaft 16 extends through a shaft bore 28 provided in the wall 26 of the housing 12. The shaft is supported in the bore 28 by ball bearing 30 having inner and outer races 32. The shaft 16 is provided with cooperating snap rings 34 received within associated shaft mounting grooves to restrain axial movement of the shaft with respect to the bearing 30. Similarly, the bearing 30 is restrained against axial movement with respect to the housing 12 by means of cooperating snap rings 36 disposed within associated mounting grooves in the bore 28. An oil seal 38 is provided within the bore 28 to form a fluid-tight seal between the bore and the shaft for retaining the fluid 15 within the cavity 13.

The clutch 18 and the brake 20 are hydroviscous units which are electromagnetically actuated as indicated above. The construction and operation of such torque transmitting units are known in the art and, for example, they are described in detail in U.S. Pat. No. 3,912,060, dated Oct. 14, 1975. Accordingly, the operation of the clutch and brake units in the subject drive is only briefly discussed below.

The rotational input of the shaft 14 is transmitted to the clutch 18 through a hub 40 which is connected to the input shaft by a key 42. The input torque is transmitted to inner drive discs 44 which engage gear teeth 46 of the hub 40. Outer driven discs 48 are interleaved with the discs 44 to transmit torque to a cup or spider 50 upon actuation of the clutch.

The spider 50 is rotationally fixed to the center coupling 22, as by welding, which in turn is keyed to the output shaft 16 by the key 52 for purposes of transmitting the output torque. The center coupling 22 is otherwise free to rotate relative to the input shaft 14 and, to that end, bearing 54 is provided between the shaft and the coupling. In order to assure a sufficient supply of fluid 15 intermediate the adjacent discs 44 and 48, a centrifugal pump 56 is fixed to the hub 40 of the clutch 18 to direct fluid flow in the direction of the arrow A to a region adjacent the innermost extent of the disc pack.

The brake 20 is carried on an internal brake reservoir 57 formed by an annular wall 58 integrally extending from the wall 26 of the housing 12 and defining a reservoir cavity 57a extending about the output shaft. The output shaft 16 extends through the reservoir 57 and a bore 58a in the wall 58. A ball bearing 59 is located in the bore 58a for supporting the inboard end of the shaft 16 within the bore.

The brake 20 includes a hub 60 which is rotationally fixed to a radially extending surface of the wall 58. The brake 20 is similar in construction and operation to the clutch 18 and, accordingly, the brake includes an interleaved disc pack 62 comprising inner drive discs and outer driven discs. Upon actuation of the brake, a retarding torque is applied to the output shaft 16 through the center coupling 22 by means of a brake cup or spider 64 which is fixed to the center coupling. In accordance with the present invention, the brake reservoir 57 assures a copious flow of fluid 15 to the brake 20 for purposes of heat dissipation as discussed below in detail.

The clutch 18 and the brake 20 are electromagnetically actuated and, accordingly, the torque transmission of each of the units is controlled by adjustment of the voltage in a magnetic flux circuit which in turn regulates the frictional fluid engagement between the interleaved discs. The speed of the output shaft 16 is monitored by a magnetic pickup 68 carried by the bracket 70 which is mounted to a stationary portion of the drive unit. The magnetic pickup senses the rotational speed of a pulse gear 72 which is fixed to the output shaft 16. The magnetic pickup 68 provides a feedback signal or voltage which is compared with a preselected set point signal or reference voltage in a servo control system (not shown). Any deviation in the compared voltages results in an error signal which increases or decreases the magnetic flux circuit voltage in either the clutch or the brake so as to appropriately adjust the output speed of the drive 10. In combination with such a control system, the drive 10 provides a variable speed drive unit, and although the illustrated drive is electromagnetically actuated, pneumatic or hydraulic actuation can be employed with appropriate transducers in the control system.

In order to contend with the high levels of heat energy developed during drive operation, the drive 10 is provided with integral cooling apparatus including as its major components a centrifugal pump 74 for circulating the fluid 15 externally of the housing 12, a heat exchanger 76 disposed about the outside surface of the housing 12, and a fluid channeling assembly 78 including the brake reservoir 57 for returning the cooled fluid 15 to the fluid sump within the cavity 13 and assuring adequate fluid supply to the brake 20. As will become more apparent in the following detailed description of the cooling apparatus, high levels of heat dissipation are obtained in accordance with the present invention in a structurally and functionally efficient manner.

The centrifugal pump 74 includes a star-shaped impeller 80 having a plurality of radially extending vanes 82. Each of the vanes 82 has an L shape, and they extend at equally spaced angular intervals from a central hub of the impeller 80 which is fixed to the input shaft 14 for rotation therewith by means of a key 84. Each of the vanes 82 includes a radially extending leg portion 82a and an axially extending blade portion 82b located remote of the shaft 14. The impeller 80 is arranged for rotation within an annular pump chamber 86 provided by a pump casing 88 which extends about the input shaft 14.

The pump casing 88 includes a pump intake port 90 disposed below the level of the fluid 15 and extending about the input shaft 14. The pump intake port 90 has an area equal to about twice the area of comparably sized centrifugal pump units in order to contend with the high level of agitation and entrained air in the fluid 15. Further, the leg portions 82a of the vanes 82 are axially spaced from the intake port 90 and the blade portions 82b do not substantially sweep the radial extent of the port during rotation so as to minimize mechanical disturbances in the fluid at the intake port and enhance the intake flow.

The pump chamber 86 and pump casing 88 have a U-shaped cross section provided by the wall portion 24a of the wall 24, an annular skirt 24b extending from the wall 24 to provide the outer circumferential wall of the casing and a cover plate 24c removably secured to the wall 24. The impeller 80 and, more particularly, the blade portions 82b of the vanes 82, are sized to fit between the wall portion 24a and the cover plate 24c with a minimum clearance consistent with efficient pumping action.

Figure 2:
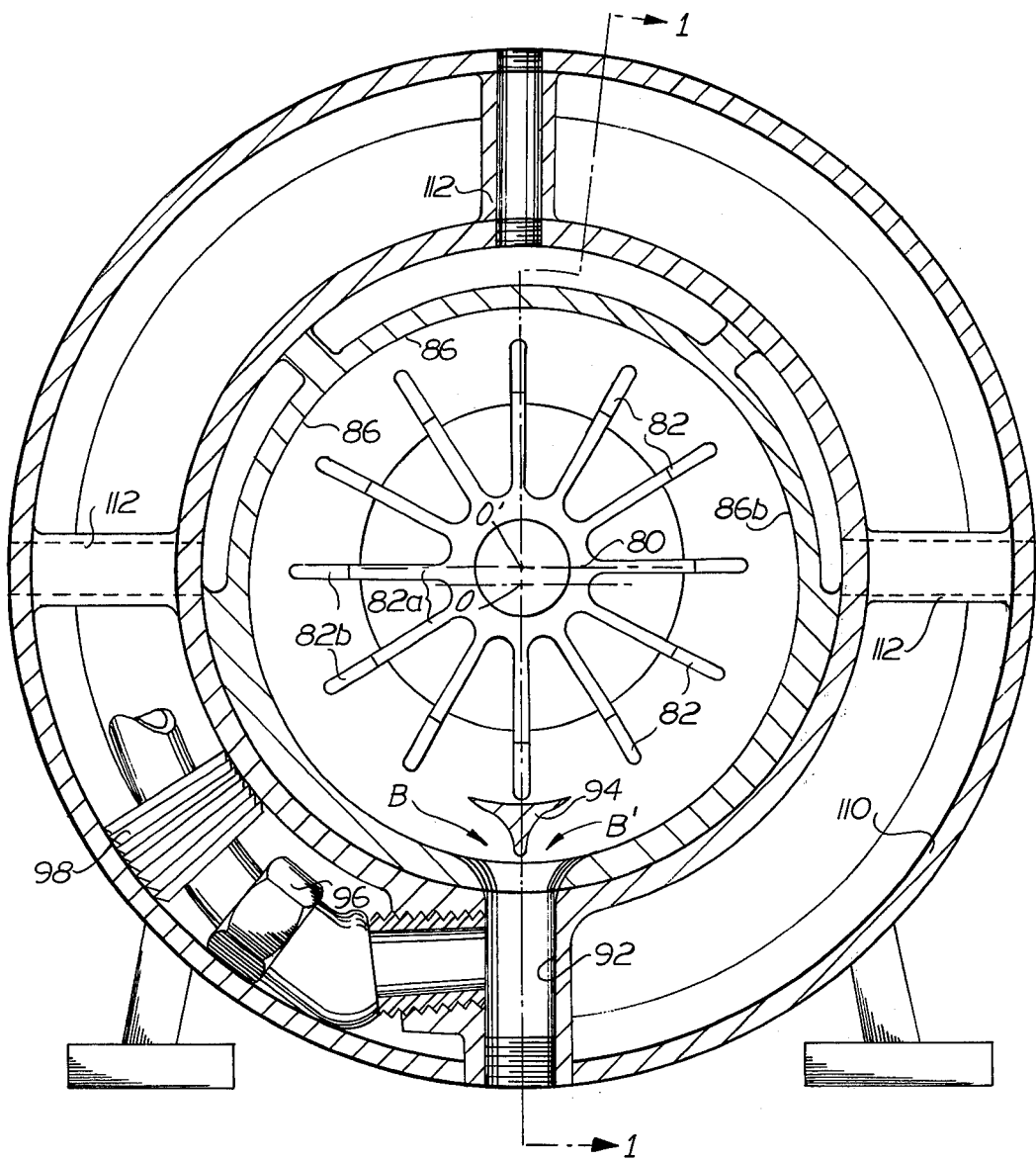
FIG. 2 is an elevational view, partially in section, with parts omitted for purposes of clarity and the plane of the section being indicated by the line 2—2 in FIG. 1; and, FIG. 3 is an end view of the drive as viewed from the right in FIG. 1 with parts broken away and omitted.
Figure 3:
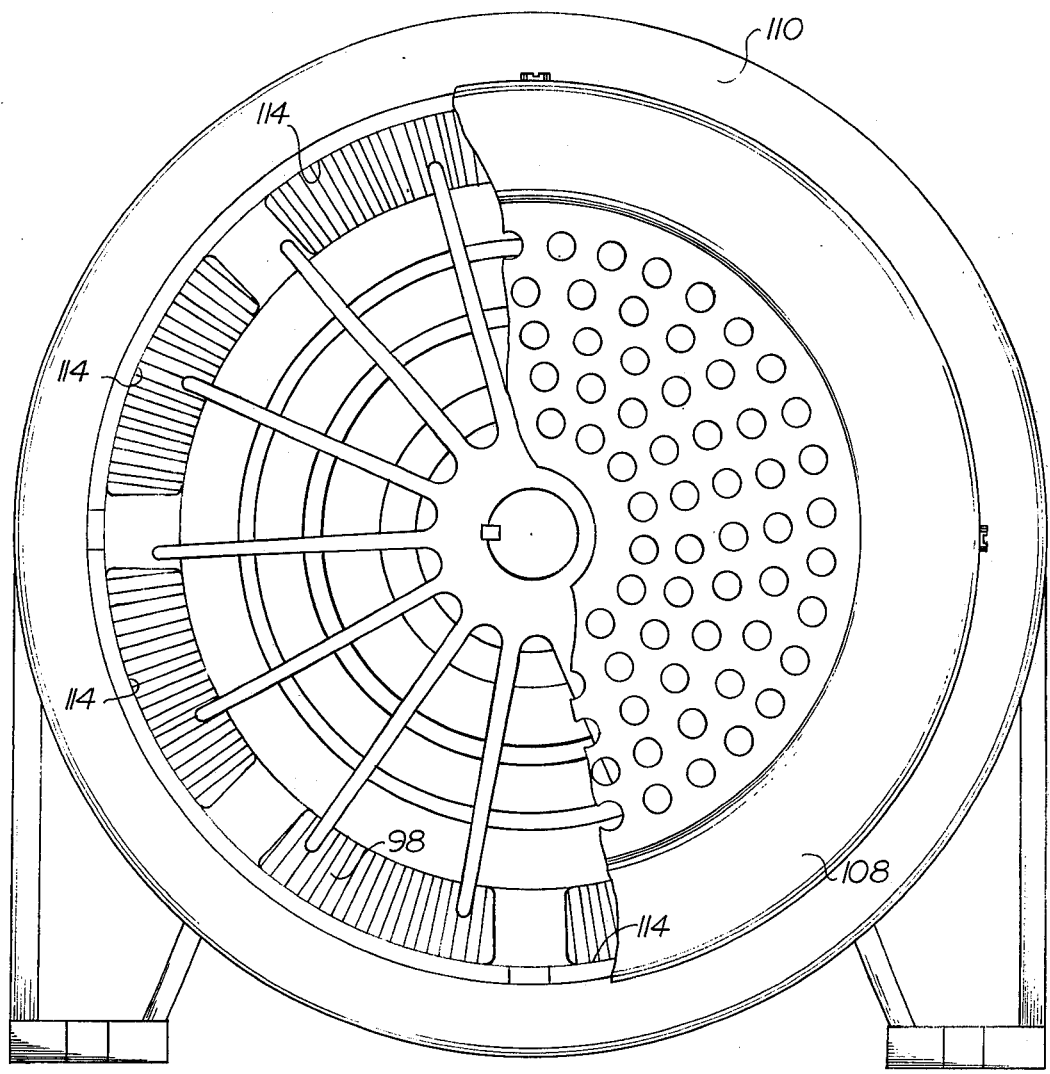

The pump chamber 86 has a symmetrical configuration in a vertical or radial plane, and the annular skirt 24b has a substantially symmetrical and circular cross section in a plane intersecting the longitudinal skirt axis O at a right angle as shown in FIG. 2. The longitudinal axis O' of the shaft 14 is parallel to the skirt axis O but spaced therefrom so as to provide the annular chamber 86 with oppositely extending volute portions 86a and 86b which communicate with a pump exhaust port 92. Accordingly, the annular chamber 86 has a progressively increasing cross sectional area in opposite angular directions extending along its arcuate length about the input shaft and toward the exhaust port 92.

The volute configuration of the pump chamber 86 assures that the pump will provide adequate fluid flow regardless of the direction of rotation of the input shaft 14 and the impeller 80. To accommodate flow in either of the volute portions 86a and 86b to the exhaust port 92 in the direction indicated by the arrows B and B' (FIG. 2), a flow director 94 formed by an integral extension of the wall 24 is located adjacent the exhaust port. Accordingly, the drive may be directly operated and incorporated in larger systems without restriction as to the direction of rotation of the input shaft 14 or alternating forward and reverse rotation of the shaft.

The pump exhaust port 92 is connected to the heat exchanger 76 by a threaded fitting 96. The heat exchanger 76 comprises a finned tube 98 coiled about the outside surface of the housing 12 in a helically wound pattern. The discharge end of the finned tube 98 is provided with a threaded fitting 100 which is connected to a sump supply port 102 for returning the cooled fluid 15 to the cavity 13 within the housing 12. The disposition of the finned tube 98 about the housing 12 is particularly advantageous since it results in a unitized or self contained drive and heat exchanger arrangement.

The heat exchanger 76 also includes a fan 104 mounted on the input shaft 14 for rotation therewith by means of a key 106. The fan is enclosed by a perforated end cover plate 108 having openings 108a extending therethrough and secured to an annular housing collar 110 supported by the housing 12 by means of angularly spaced support webs 112.

The ambient air is directed by the fan 104 through openings 114 in the collar 110, intermediate the webs 112, and over the finned tube 98, as indicated by the arrows E. The output end of the drive is provided with a structure similar to the input end, and the heated air after contacting the finned tube 98 passes through similar openings in an output end annular collar 110' and cover plate 108'. A cylindrical cover plate 115 which may be conveniently formed in arcuate sections extends between the annular collars 110 and 110' to protectively surround the finned tube 98. The cover plate 115 is provided with perforations 115a through which some or all of the fan blown cooling air may pass after contacting the finned tube 98 depending upon closure of the openings in the collar 110' and/or cover plate 108'. The disposition of the finned tube 98 about the housing 12 and the air flow provided by the fan 104 is particularly efficient since the housing 12 is itself capable of radiating heat or convecting heat to the air that is being passed over the finned tubing.

The cooled fluid 15 existing from the heat exchanger 76 is returned to the fluid sump through the sump supply port 102 as indicated by the arrows C and C' (FIG. 1). A portion of the returning fluid, indicated by the arrow C', enters the brake reservoir 57 through an intake port 116 in the annular housing wall 58. Thus, the supply port 102 and the intake port 116 are located adjacent one another and spaced so as to assure fluid flow to the brake reservoir 57 under the pressure head available when the fluid exits from the finned tube 98. The input flow to the reservoir is substantially limited to the fluid 15 received from the supply port 102.

The centrifugal pump 74 and the brake reservoir 57 are sized so that an ample amount of fluid 15 is continuously supplied at a relatively low pressure and velocity head to the brake 20 for the hydroviscous operation thereof. The fluid 15 enters the brake 20 through the bearing 59 as indicated by the arrows D, and communicating channels are provided in the hub 60 to deliver the fluid adjacent the root of the disc pack 62. It is desirable that excessive supply pressures be avoided since they will inhibit the operation of the brake 20 and the closing of the disc pack 62 to provide a braking torque. On the other hand, it is also desirable that an abundant supply of fluid be available since an insufficient amount of fluid results in marginal cooling of the disc pack 62. These advantages are achieved in accordance with the present invention by the fluid channel arrangement 78 which delivers the cooled fluid 15 to the brake 20 through the reservoir 57.

As shown by the illustrated embodiment, the prior art problems relating to circulating the highly agitated and cavitated fluid within the housing are overcome by the centrifugal pump 74 which provides an efficient, integrally contained pump for circulating the fluid to an external heat exchanger. The disposition of the centrifugal pump 74 and the internal brake reservoir 57 adjacent opposite axial ends of the housing 12 enables each of these components to be conveniently mounted within the housing cavity and partially formed by integral portions of the housing casting. Further, the opposed locations of the pump and reservoir complement the disposition of the heat exchanger 76 about the external surface of the housing since it enables the cooled fluid to be returned to the sump at a location remote of the pump intake and delivered to the brake reservoir at a reduced, relatively low pressure head. The disposition of the heat exchanger about the housing also enables the use of an input shaft driven fan to further improve the heat dissipating capacity of the cooling apparatus by the direct action of the fan blown air on the heat exchanger and the drive housing. Accordingly, the illustrated embodiment comprises a self-contained drive including integral cooling apparatus which provides a thermal capacity not heretofore available and which does not require separate or independent support, drive or control devices.

What is claimed is:

1. A drive of the type having a housing containing a sump for a fluid which is heated by the generation of heat energy in said fluid during torque transmission comprising torque transmitting means and fluid cooling means, said torque transmitting means including relatively movable torque transmitting members operably connected between an input shaft and an output member for torque transmission therebetween with the generation of heat energy in said fluid, said fluid cooling means including pump means located within said housing for directly drawing fluid from said sump and circulating the fluid externally of said housing through heat exchanger means for cooling the fluid and dissipating heat energy, and fluid channeling means for returning the cooled fluid to said sump, said pump means comprising a centrifugal pump including a pump intake port extending about said input shaft below the level of fluid in said sump and radially extending vanes operably connected to said input shaft for rotational fluid pumping movement therewith upon rotation of the input shaft in either angular direction.

2. A drive as set forth in claim 1 wherein said centrifugal pump includes an annular pump chamber and said radially extending vanes are arranged for rotation therein, said annular pump chamber being connected between said intake port and a pump exhaust port and having a progressively increasing cross sectional area in angular directions extending along its arcuate length toward said pump exhaust port.

3. A drive as set forth in claim 2 wherein said centrifugal pump includes a pump casing providing said annular pump chamber, and said pump casing includes an outer circumferential wall provided by an annular skirt extending from said housing.

4. A drive as set forth in claim 2 wherein said annular skirt encircles said input shaft.

5. A drive as set forth in claim 4 wherein said annular skirt has a cylindrical configuration and a substantially symmetrical cross section in a plane intersecting the longitudinal axis of said skirt at a right angle, and said input shaft has a longitudinal axis parallel to said skirt axis and spaced therefrom.

6. A drive as set forth in claim 2 wherein said annular pump chamber is provided by a pump casing comprising an annular skirt integrally extending from said housing about said input shaft and a cover plate secured to said skirt, said cover plate having an opening therethrough for receiving said input shaft and providing said pump intake port.

7. A drive as set forth in claim 1 wherein said torque transmitting means comprise a clutch and a brake which each include relatively movable torque transmitting members operably connected between said input shaft and output member, and said fluid channeling means include an internal brake reservoir for supplying fluid to said brake at a positive pressure.

8. A drive as set forth in claim 7 wherein said internal brake reservoir comprises a cavity defined by an annular wall extending from said housing about said output member.

9. In a torque transmitting unit including a housing containing a sump for a fluid which is heated by the generation of heat energy in said fluid upon transfer of torque between an input shaft and an output shaft operably connected by relatively movable torque transmitting members, the improvement comprising pump means located within said housing for drawing fluid from said sump and circulating the fluid externally of said housing through heat exchanger means for cooling the fluid and dissipating heat energy, and fluid channeling means for returning the cooled fluid to said sump, said pump means comprising a centrifugal pump including a pump intake port extending about said input shaft below the level of the fluid in said sump and radially extending vanes operably connected to said input shaft for rotational fluid pumping movement therewith upon rotation of the input shaft in either angular direction, said radially extending vanes being arranged for rotational movement within an annular pump chamber extending around said input shaft and connected between said pump intake port and a pump exhaust port, said annular pump chamber having a progressively increasing cross sectional area in angular directions extending along its arcuate length toward said pump exhaust port.

10. A torque transmitting unit as set forth in claim 9 wherein said centrifugal pump includes a pump casing provided by an annular skirt integrally extending from said housing about said input shaft and a cover plate secured to said skirt, said cover plate having an opening therethrough for receiving said input shaft and providing said pump intake port.

11. A torque transmitting unit as set forth in claim 9 wherein said radially extending vanes are provided by a star-shaped impeller having a central hub rotationally fixed to said input shaft, and each of said vanes includes a radially extending portion axially spaced from said pump intake port and an axially extending blade portion substantially radially clear of said pump intake port.

12. A torque transmitting unit as set forth in claim 9 wherein said annular pump chamber has a longitudinal axis and a substantially symmetrical cross section in a plane intersecting said chamber axis at a right angle, and said input shaft has a longitudinal axis parallel to said chamber axis and spaced therefrom.

13. A drive having integral drive cooling means comprising a housing containing a sump of torque transmission fluid which is heated by the generation of heat energy upon torque transfer between an input shaft and an output member operably connected by torque transmitting means including relatively movable torque transmitting members, said integral drive cooling means including pump means located within said housing for directly drawing fluid from said sump and circulating the fluid externally of said housing through heat exchanger means for cooling the fluid and dissipating heat energy, and fluid channeling means for returning the cooled fluid to said sump, said pump means comprising a centrifugal pump including a pump intake port extending about said input shaft below the level of fluid in said sump for drawing fluid from the surrounding sump and radially extending vanes operably connected to said input shaft for rotational movement therewith, said radially extending vanes being disposed within an annular pump chamber communicating with said intake port and having oppositely extending volute portions for pumping fluid upon rotation of said vanes in either angular direction to a pump exhaust port communicating with said heat exchanger means, said heat exchanger means including a heat exchanger disposed about said housing and fan means operably connected to said input shaft for blowing ambient air into contact with said heat exchanger.

14. A drive as set forth in claim 13 wherein said heat exchanger comprises expanded surface tubing coiled about said housing.

15. A drive as set forth in claim 13 wherein said torque transmitting means include a brake and a clutch which each include relatively movable torque transmitting members operably connected between said input shaft and output member, and said fluid channeling means include an internal brake reservoir for receiving cooled fluid from said heat exchanger and supplying the cooled fluid to said brake at a positive pressure.

16. A drive as set forth in claim 13 wherein said annular pump chamber is provided by a pump casing having an outer circumferential wall provided by an annular skirt extending from said housing about said input shaft.

* * * * *